(12) United States Patent
Yu et al.

(10) Patent No.: US 11,262,848 B1
(45) Date of Patent: Mar. 1, 2022

(54) METHOD AND HEAD-MOUNTED DEVICE FOR REDUCING MOTION SICKNESS IN VIRTUAL REALITY

(71) Applicant: NATIONAL TAIWAN UNIVERSITY OF SCIENCE AND TECHNOLOGY, Taipei (TW)

(72) Inventors: Neng-Hao Yu, Taipei (TW); Yen-Yang Chen, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 17/341,085

(22) Filed: Jun. 7, 2021

(30) Foreign Application Priority Data

Dec. 10, 2020 (TW) .................................. 109143736

(51) Int. Cl.
*G06F 3/01* (2006.01)
*G02B 27/01* (2006.01)

(52) U.S. Cl.
CPC .......... *G06F 3/016* (2013.01); *G02B 27/0176* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 10,583,358 B1* | 3/2020 | Garcia | A63F 13/245 |
| 2009/0046140 A1* | 2/2009 | Lashmet | G09G 3/002 |
| | | | 348/51 |
| 2014/0137714 A1* | 5/2014 | Krenik | B26B 19/3806 |
| | | | 83/23 |
| 2014/0282282 A1* | 9/2014 | Holz | G06F 13/105 |
| | | | 715/863 |
| 2015/0068052 A1* | 3/2015 | Krueger | G01C 9/10 |
| | | | 33/301 |
| 2016/0041048 A1* | 2/2016 | Blum | G06F 1/1684 |
| | | | 73/774 |
| 2018/0108147 A1* | 4/2018 | Kim | G06F 3/0482 |
| 2019/0050062 A1* | 2/2019 | Chen | G06T 7/70 |
| 2019/0212813 A1* | 7/2019 | Yang | G06F 3/011 |
| 2020/0061332 A1* | 2/2020 | Dry | A61M 21/00 |
| 2020/0097077 A1* | 3/2020 | Nguyen | G06F 3/04842 |
| 2021/0283496 A1* | 9/2021 | Mandella | A63F 13/53 |

* cited by examiner

*Primary Examiner* — Toan H Vu
(74) *Attorney, Agent, or Firm* — Chun-Ming Shih; HDLS IPR Services

(57) ABSTRACT

Disclosed is a method for reducing motion sickness in virtual reality (VR) of a user, comprising determining a pattern of force cue based on a motion signal of a locomotion in the VR, the pattern of force cue including a type of force cue, a position of application or a direction of application, a time of application, and an amplitude of force cue, and applying a force cue to a head of the user according to the pattern of force cue, wherein the force cue corresponds to an inertial force and/or a centrifugal force in connection with the motion signal. Also disclosed is a head-mounted device thereof.

19 Claims, 14 Drawing Sheets

S31 — DETERMINING A PATTERN OF FORCE CUE BASED ON A MOTION SIGNAL OF A LOCOMOTION IN THE VR, THE PATTERN OF FORCE CUE INCLUDING A TYPE OF FORCE CUE, A POSITION OF APPLICATION OR A DIRECTION OF APPLICATION, A TIME OF APPLICATION, AND AN AMPLITUDE OF FORCE CUE

S32 — APPLYING A FORCE CUE TO A HEAD OF THE USER ACCORDING TO THE PATTERN OF FORCE CUE, WHEREIN THE FORCE CUE CORRESPONDS TO AN INERTIAL FORCE AND/OR A CENTRIFUGAL FORCE IN CONNECTION WITH THE MOTION SIGNAL

FIG. 3

METHOD AND HEAD-MOUNTED DEVICE FOR REDUCING MOTION SICKNESS IN VIRTUAL REALITY

TECHNICAL FIELD

The present disclosure relates to a method for reducing motion sickness in virtual reality (VR) of a user, and particularly, to a method for reducing motion sickness in VR by applying a haptic or tactile force cue on a head of a user. The present disclosure also relates to a head-mounted device for reducing motion sickness in VR.

BACKGROUND

Virtual reality (VR) has a wide range of applications all over the world, whether in medicine, entertainment or industry, and both its hardware and software technologies are developing rapidly. However, in view of the current VR experience, there is still an urgent need to reduce or ameliorate a user's motion sickness in VR.

The main cause of VR motion sickness is discordance between visual sensory signals and other sensory signals of the body. For example, the visual image seen by a user is moving or rotating at high or low speed, but the body does not actually move, causing a temporary conflict between visual sensory and the vestibular systems, that is, discordance between vestibular signals and visual sensory signals.

The existing methods for solving VR motion sickness are generally divided into three categories. The first category uses sensory stimuli other than visual stimuli to increase or interfere with the vestibular perception, for example, stimulating vestibule by electric current or sound. However, this category of methods is easy to cause other discomforts or a less immersive experience. The second category uses a motion platform to compensate the body with missing motion signals, but this category of methods usually requires complex mechanisms or expensive apparatus. The third category is to reduce visual motion stimuli, for example, to limit the visible range of the visual screen, but this category of approaches greatly reduces the immersion of a user.

SUMMARY OF THE INVENTION

In view of the technical problems of the prior art, the present invention provides a method for reducing motion sickness in virtual reality (VR), which not only reduces a user's discomfort caused by motion sickness, but also helps the user imagine a virtual motion, thereby increasing the user's sense of immersion and pleasure. Further, the hardware structure required for the method is simple, and thus it can be easily integrated and configured in a head-mounted display device, without largely increasing the cost of the head-mounted display device.

In one aspect, the present invention provides a method for reducing motion sickness in VR of a user, comprising determining a pattern of force cue based on a motion signal of a locomotion in the VR, the pattern of force cue including a type of force cue, a position of application or a direction of application, a time of application, and an amplitude of force cue; and applying a force cue to a head of the user according to the pattern of force cue; wherein the force cue corresponds to an inertial force and/or a centrifugal force in connection with the motion signal.

According to certain embodiments of the present invention, the type of force cue is vibration. In such embodiments, the pattern of force cue includes a position of application, and the position of application is related to a direction of the inertial force. For example, (i) when the direction of the inertial force is leftward, the position of application corresponds to a left part of the head of the user, (ii) when the direction of the inertial force is rightward, the position of application corresponds to a right part of the head of the user, (iii) when the direction of the inertial force is forward, the position of application corresponds to a front part of the head of the user, and (iv) when the direction of the inertial force is backward, the position of application corresponds to a rear part of the head of the user.

According to the present invention, the vibration preferably has a frequency of about 50 Hz to about 160 Hz.

In certain embodiments of the present invention, the type of force cue is of a translational force or a rotational force. The translational force or the rotational force may be generated by one or more air nozzles configured on a head-mounted device.

Preferably, the translational force or the rotational force simulates the inertial force and/or the centrifugal force. According to some embodiments the present invention, the pattern of force cue includes a direction of application consistent with the direction of the inertial force and/or the centrifugal force.

In another aspect, the present invention provides a head-mounted device for reducing motion sickness in virtual reality (VR) of a user, comprising a computing module; and a haptic cue module electrically connected to the computing module, including a plurality of haptic force generating elements respectively positioned on the head-mounted device corresponding to a plurality of parts of a head of the user; wherein the computing module determines a pattern of force cue based on a motion signal of a locomotion in the VR, the pattern of force cue including a type of force cue, a position of application or a direction of application, a time of application, and an amplitude of force cue; and the computing module commands the haptic cue module to apply a force cue, through at least one of the plurality of haptic force generating elements, to a head of the user according to the pattern of force cue; and wherein the force cue corresponds to an inertial force and/or a centrifugal force in connection with the motion signal.

According to certain embodiments of the present invention, the type of force cue is vibration. In such embodiments, the pattern of force cue includes a position of application, and the position of application is related to a direction of the inertial force. For example, (i) when the direction of the inertial force is leftward, the position of application corresponds to a left part of the head of the user, (ii) when the direction of the inertial force is rightward, the position of application corresponds to a right part of the head of the user, (iii) when the direction of the inertial force is forward, the position of application corresponds to a front part of the head of the user, and (iv) when the direction of the inertial force is backward, the position of application corresponds to a rear part of the head of the user.

According to the present invention, the force cue may be generated by one or more haptic force generating elements, each of which is a vibration motor.

In certain preferred embodiments, the vibration has a frequency of about 50 Hz to about 160 Hz.

According to certain embodiments of the present invention, the type of force cue is of a translational force or a rotational force. The force cue may be generated by one or more haptic force generating elements, each of which is an air nozzle Preferably, the translational force or the rotational force simulates the inertial force and/or the centrifugal force. More specifically, the pattern of force cue includes a direction of application consistent with the direction of the inertial force and/or the centrifugal force.

These and other aspects will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The foregoing summary, as well as the following detailed description of the invention, will be better understood when read in conjunction with the appended drawing. In the drawings:

FIG. 3 is a flowchart of a method for reducing motion sickness in VR according to one embodiment of the present invention.

DESCRIPTION OF THE INVENTION

Figure 1A:
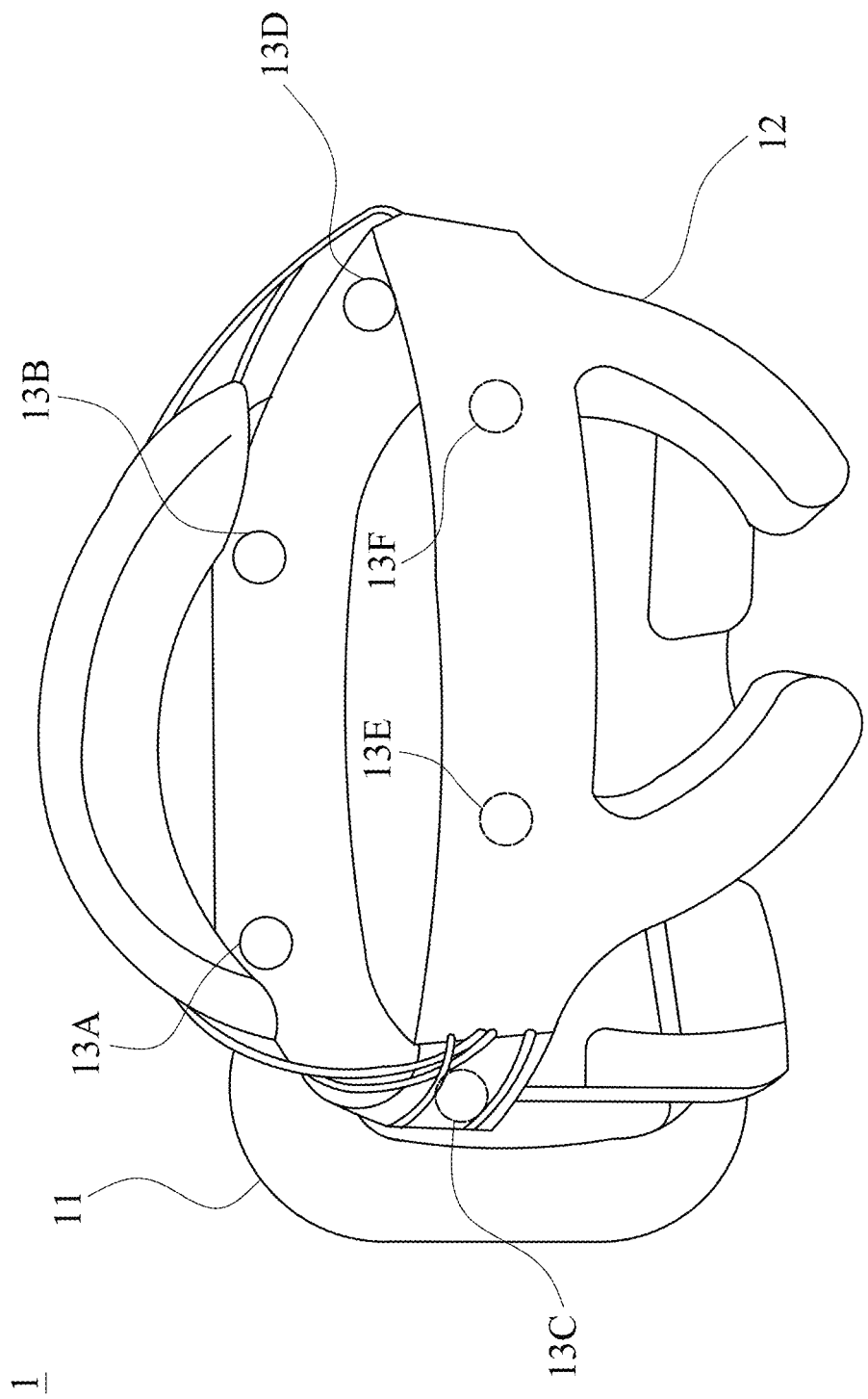
FIG. 1A is a perspective view of a head-mounted display device for reducing motion sickness in virtual reality (VR) according to one embodiment of the present invention.

Unless defined otherwise, all technical and scientific terms used herein have the same meaning as commonly understood by a person skilled in the art to which this invention belongs.

As used herein, the singular forms "a", "an", and "the" include plural referents unless the context clearly dictates otherwise. Thus, for example, reference to "a sample" includes a plurality of such samples and equivalents thereof known to those skilled in the art.

In one aspect, the present invention provides a method for reducing motion sickness in VR of a user, comprising determining a pattern of force cue based on a motion signal of a locomotion in the VR, the pattern of force cue including a type of force cue, a position of application or a direction of application, a time of application, and an amplitude of force cue; and applying a force cue to a head of the user according to the pattern of force cue; wherein the force cue corresponds to an inertial force and/or a centrifugal force in connection with the motion signal.

In another aspect, the present invention provides a head-mounted device for reducing motion sickness in virtual reality (VR) of a user, comprising a computing module; and a haptic cue module electrically connected to the computing module, including a plurality of haptic force generating elements respectively positioned on the head-mounted device corresponding to a plurality of parts of a head of the user; wherein the computing module determines a pattern of force cue based on a motion signal of a locomotion in the VR, the pattern of force cue including a type of force cue, a position of application or a direction of application, a time of application, and an amplitude of force cue; and the computing module commands the haptic cue module to apply a force cue, through at least one of the plurality of haptic force generating elements, to a head of the user according to the pattern of force cue; and wherein the force cue corresponds to an inertial force and/or a centrifugal force in connection with the motion signal.

According to one embodiment of the present invention, a force cue is determined based on a motion signal of the VR, and the force cue is applied an appropriate position of a user's head through a head-mounted display device, but does not make the user feel discomfort and does not reduce the sense of immersion.

According to one embodiment of the present invention, the method comprises obtaining the motion signal by detecting a motion of the user in response to the image. This is called as the "active mode." For example, if the image represents that the user is driving a car to turn right, and the user uses an input device to perform body movements such as turning left (through the input device, the user makes an action of turning a steering wheel to the left and tilting his body to the left), such action generates a motion signal.

In another embodiment, the motion signal is generated based on a change in the VR images/video. This is called as the "passive mode." For example, if the image represents that the user is fast running while the user only percepts the running through the image without making corresponding actions in the real world, the motion signal is generated according to said change.

According to the present invention, the motion signal may also be directly obtained from a source of VR images or video.

According to the present invention, the type of force cue may be determined based on a manual user configuration, or based on a type of the locomotion in the VR. In general, a vibrating force cue is more suitable for a two-dimensional locomotion, such as walking, running, driving, boating and biking, and a rotational force cue is suitable for both a two-dimensional locomotion and a three-dimensional locomotion in the VR.

According to certain embodiments of the present invention, the method further comprises obtaining a range of the amplitude of force cue, the range comprising a minimal amplitude value and a maximal amplitude value, wherein the amplitude of the force cue applied is ranging from the minimal amplitude value to the maximal amplitude value. In one embodiment, the minimal amplitude value and/or the maximal amplitude value are/is manually configured by the user. When the motion signal is equal to or greater than a pre-determined threshold value, the force cue is generated and applied to a specific position of the head of the user. The pre-determined threshold value may be configured by default or by the user.

According to the present invention, each of the plurality of haptic force generating elements may be a pneumatic actuator, a pneumatic jet device, a servo motor, or a combination thereof. For example, each of the plurality of haptic force generating elements may be an air nozzle, a vibration motor, or a combination thereof.

According to certain embodiments of the present invention, the type of force cue is vibration. In such embodiments, the pattern of force cue includes a position of application, and the position of application is related to a direction of the inertial force. For example, (i) when the direction of the inertial force is leftward, the position of application corresponds to a left part of the head of the user, (ii) when the direction of the inertial force is rightward, the position of application corresponds to a right part of the head of the user, (iii) when the direction of the inertial force is forward, the position of application corresponds to a front part of the head of the user, and (iv) when the direction of the inertial force is backward, the position of application corresponds to a rear part of the head of the user.

According to the present invention, the vibration preferably has a frequency of about 50 Hz to about 160 Hz.

In certain embodiments of the present invention, the type of force cue is of a translational force or a rotational force. The translational force or the rotational force may be generated by one or more air nozzles configured on a head-mounted device.

Preferably, the translational force or the rotational force simulates the inertial force and/or the centrifugal force. According to some embodiments the present invention, the pattern of force cue includes a direction of application consistent with the direction of the inertial force and/or the centrifugal force.

According to the present invention, the position of application is related to a direction of the motion signal, and thus, a direction of an inertial force and/or a centrifugal force in connection with the motion signal. The motion signal is a vector signal, and thus, the force cue is also a vector signal, and is applied to a position of the head of the user corresponding to the direction of the motion signal. In other words, the position of the head of the user to be applied with the force cue is determined based on the direction of the motion signal, or the direction of the inertial force and/or the centrifugal force in connection with the motion signal.

According to the present invention, in addition to the type of force cue, the relationship between the force cue and the motion signal may also be related to the type of locomotion.

According to the present invention, the type of locomotion includes but is not limited to walking, running, driving, flying, boating, biking, or skiing.

In one embodiment of the present invention, the type of locomotion is walking, and when the amplitude of the motion signal is equal to or greater than a pre-determined threshold value, the force cue is applied at a constant amplitude.

In another embodiment of the present invention, the type of locomotion is driving, and when (i) the amplitude of the motion signal is equal to the pre-determined threshold value, the force cue is applied at a minimal amplitude; (ii) the amplitude of the motion signal is equal to or greater than a saturation value, the force cue is applied at a maximal amplitude; and (iii) the amplitude of the motion signal is between the pre-determined threshold value and the saturation value, the force cue is applied at an amplitude proportional to the amplitude of the motion signal.

According to certain embodiments of the present invention, the computing module is configured in or on the head-mounted device.

With reference to the drawings, certain preferred embodiments of the present invention are described below.

Please refer to FIG. 1A, which is a perspective view of a head-mounted display device for reducing motion sickness in virtual reality (VR) according to one embodiment of the present invention. Provided is a head-mounted display device 1, comprising a display module 11, a mounting module 12 connected to the display module 11, a computing module (not shown) configured in the head-mounted display device 1, and a haptic cue module electrically connected to the computing module, the haptic cue module including six haptic force generating elements 13A-13F respectively positioned in the head-mounted display device 1 corresponding to a plurality of parts of a head of a user. The display module 11 has a display and is configured corresponding to the position of the eyes of the user, for presenting VR images/video to the user. The mounting module 12 is used to mount the head-mounted display device 1 on the user's head, and generally has a ring structure, but is not limited thereto.

The computing module determines a type of locomotion in the VR and obtains a motion signal, and determines a pattern of force cue based on a motion signal of a locomotion in the VR, the pattern of force cue including a type of force cue, a position of application or a direction of application, a time of application, and an amplitude of force cue. The computing module commands the haptic cue module to apply the force cue, through at least one of the plurality of haptic force generating elements 13A-13F, to the user's head.

Figure 1B:
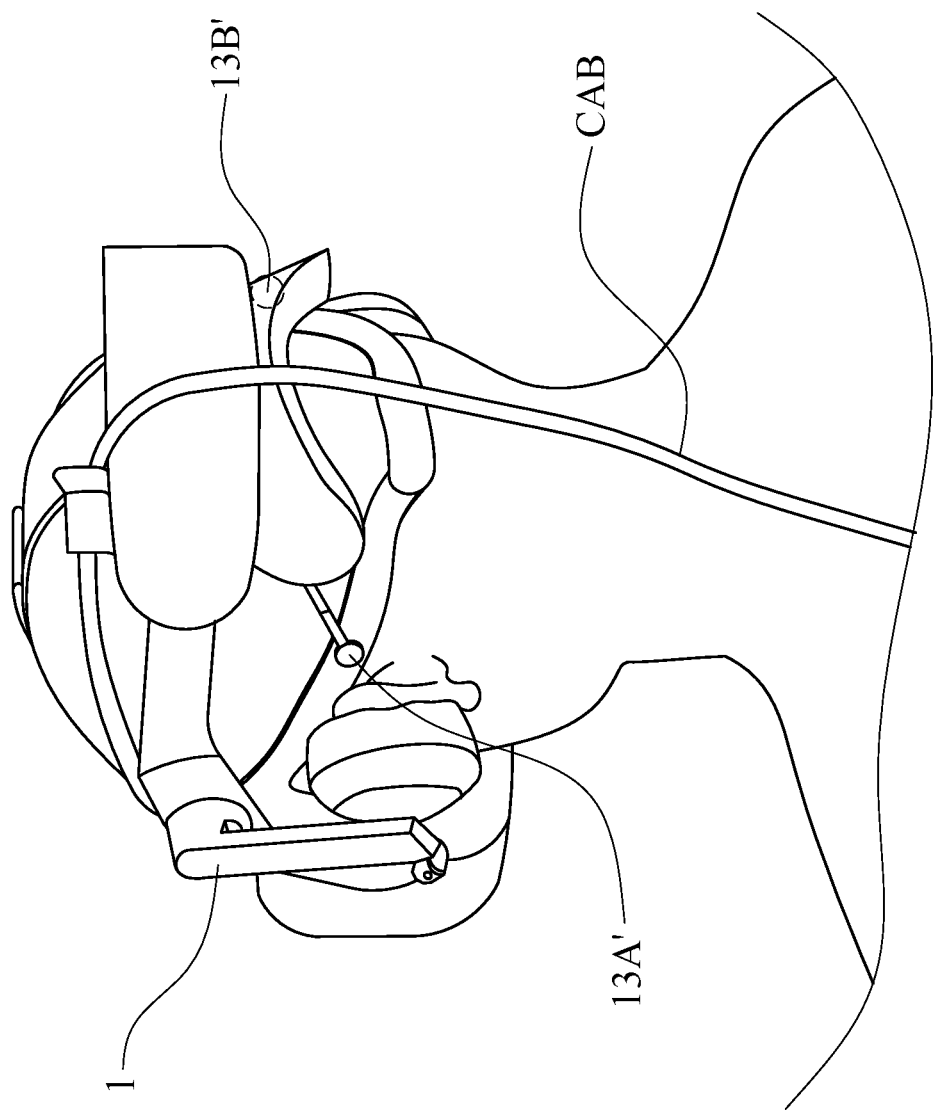
FIG. 1B is a perspective view of a head-mounted device for reducing motion sickness in VR according to one embodiment of the present invention.

Please refer to FIG. 1B, which is a perspective view of a head-mounted device for reducing motion sickness in VR according to one embodiment of the present invention. The head-mounted device for reducing motion sickness in VR is an independently functioning device which is additionally and externally configured on a head-mounted display device 1. The head-mounted device for reducing motion sickness in VR includes a computing module (not shown, electrically connected to haptic force generating elements 13A' and 13B' through a cable CAB), and a haptic cue module (including at least two haptic force generating elements 13A' and 13B').

Figure 1C:
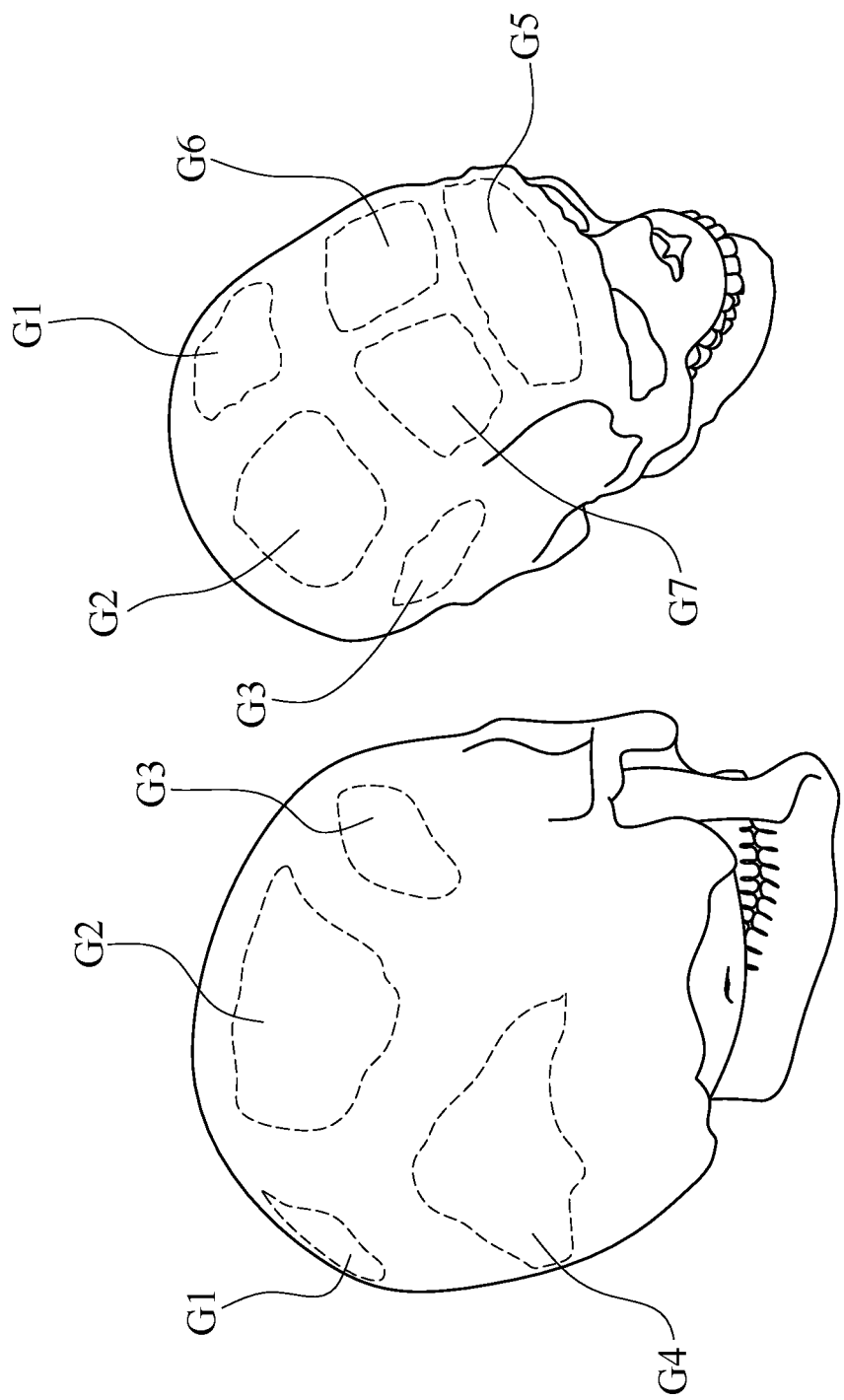
FIG. 1C illustrates positions on a head of a user to be applied with a force cue by a head-mounted device for reducing motion sickness in VR according to one embodiment of the present invention.

Now please refer to FIG. 1C. FIG. 1C illustrates positions on a head of a user to be applied with a force cue by a head-mounted device for reducing motion sickness in VR according to one embodiment of the present invention. Illustrated are areas G1-G7 to be applied with a force cue, wherein area G1 is an area of the left back of the head, area G2 is an area of the right back of the head, area G3 is an area around the right ear, area G4 is an area of the middle back of the head, area G5 is an area of the forehead, area G6 is an area of the left top of the head, and area G7 is an area of the right top of the head. Please note the areas to be applied with a force cue are not limited to the areas G1-G7 mentioned above, a skilled artisan may adjust the areas according to the actual situation.

Figure 1D:
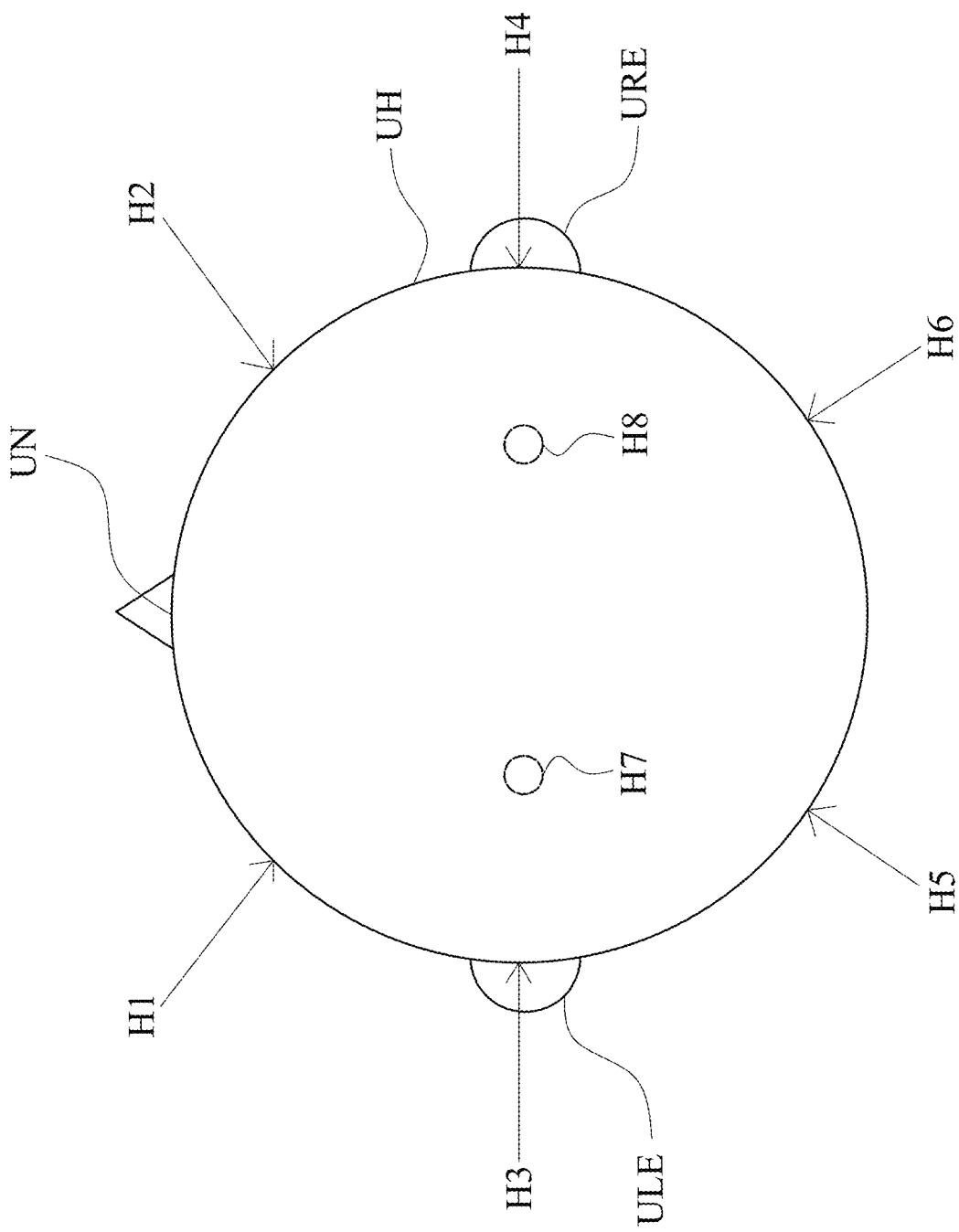
FIG. 1D illustrates positions on a head of a user to be applied with a haptic force by a head-mounted device for reducing motion sickness in VR according to another embodiment of the present invention.

FIG. 1D illustrates positions on a head of a user to be applied with a force cue by a head-mounted device for reducing motion sickness in VR according to another embodiment of the present invention. Referring to FIG. 1A along with FIG. 1D, six haptic force generating elements 13A-13F are respectively configured in the mounting module 12, wherein the haptic force generating elements 13A and 13B are used to apply force cues H1 and H2 to a left side and a right side of a forehead UN of a head UH of a user, respectively; the haptic force generating elements 13C and 13D are used to apply force cues H3 and H4 to a upper side of a left ear ULE and a upper side of a right ear URE of the head UH of the user (i.e., around left and right temples), respectively; and the haptic force generating elements 13E and 13F are used to apply force cues H5 and H6 to a left back and a right back of the head UH of the user, respectively.

Each of the haptic force generating elements 13A-13F, 13A' and 13B' may be a pneumatic actuator, a pneumatic jet device, a servo motor, or a combination thereof, and may generate a vibrating force, a puffing force (a propulsion), a tapping force, or a combination thereof. According to one embodiment, the mounting module 12 may have a hemispherical shape, and may be further configured with two haptic force generating elements used to apply force cues H7 and H8 (see FIG. 1D) to a left top and a right top of the head UH of the user, respectively.

Briefly, the number and positions of the haptic force generating elements may be modified in view of the actual applications, and are not limited in the present invention. Without loss of generality, at least four haptic force generating elements may be configured corresponding to a front, a back, a left side and a right side of a head of a user, respectively, and preferably, an additional haptic force generating element may be configured corresponding to a top of the head of the user.

Please refer to FIG. 1A again. In an "active mode," the head-mounted device for reducing motion sickness in VR may detect a motion signal of a user's motion in response to VR images/video and determine a type of locomotion, and then determine a force cue based on the motion signal of the type of locomotion, and subsequently, apply a force cue through at least one of the haptic force generating elements 13A-13F to a user's head. For example, when the VR images/video is of braking in driving, the user would make an action similar to stepping on the brake. If a motion signal representing a forward stepping of a right foot is equal to or greater than a pre-determined threshold value, the head-mounted device for reducing motion sickness in VR determines a force cue and applies the force cue through the haptic force generating elements 13A and 13B, so as to provide the user with a leaning forward perception of braking. Accordingly, the discordance between visual sensory signals and haptic sensory signals is reduced, and motion sickness of the user can be prevented.

Another example for an "active mode" is provided. When the VR images/video is of turning right in running, the stepping force of a right foot of a user would increase and a body of the user would lean to the right. The motion signal is detected and a corresponding force cue is applied through the haptic force generating elements 13B, 13D, and 13F, wherein the force cue generated by the haptic force generating element 13B is greater than that generated by the haptic force generating element 13D, so as to provide the user with a perception of leaning to right in running. Accordingly, the discordance between visual sensory signals and haptic sensory signals is reduced, and motion sickness of the user can be prevented.

In a "passive mode," the head-mounted device for reducing motion sickness in VR may determine a motion signal and a type of locomotion based on a change in the VR images/video, and then determine a force cue based the motion signal and the type of locomotion. For example, when the VR images/video is of turning right in flying, a motion signal would be determined based on the VR images/video and a corresponding force cue is applied through the haptic force generating elements 13A, 13C, and 13E, so as to provide the user with a perception of a centrifugal force on a left side of the body. Accordingly, the discordance between visual sensory signals and haptic sensory signals is reduced, and motion sickness of the user can be prevented.

In view of the above, it is understood that unlike certain prior technologies in which the motion sickness is ameliorated after it is detected, a head-mounted device for reducing motion sickness in VR of the present invention prevents motion sickness mainly before it happens, so it is less likely to cause discomforts and reduction of immersion of a user.

Figure 2:
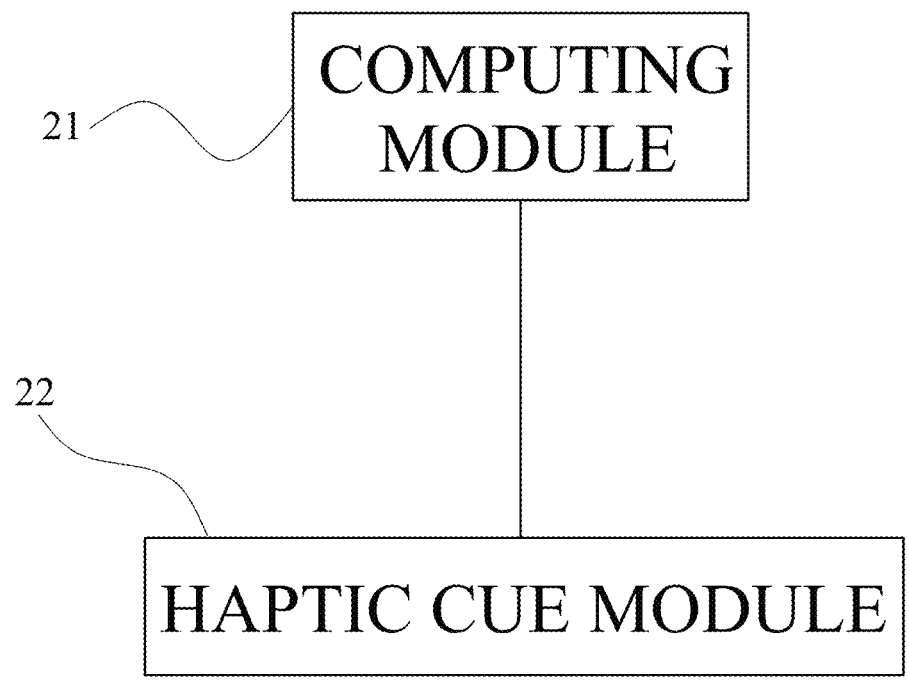
FIG. 2 is a block diagram of a head-mounted device for reducing motion sickness in VR according to one embodiment of the present invention.

Now please refer to FIG. 2, which is a block diagram of a head-mounted device for reducing motion sickness in VR according to one embodiment of the present invention. Provided is a head-mounted device for reducing motion sickness 2, comprising a computing module 21 and a head-mounted haptic cue module 22. The computing module 21 obtains a type of locomotion based on the VR images/video, and is used to obtain a motion signal. Specifically, the computing module 21 may be communicatively connected to a sensor of an input device of a head-mounted display device, in order to obtain a motion signal (in an "active mode"), or the computing module 21 may obtain a motion signal based on a change in the VR images/video (in a "passive mode").

In an "active mode," the computing module 21 obtains a motion signal corresponding to a motion of a user and determines a type of locomotion based on a VR content (VR images/video), wherein the motion signal is a vector signal. The computing module 21 subsequently determines a pattern of force cue based on a motion signal of a locomotion in the VR, the pattern of force cue including a type of force cue, a position of application or a direction of application, a time of application, and an amplitude of force cue. When the motion signal is equal to or greater than a pre-determined threshold value, meaning that an application of force cue to the user is needed, the head-mounted haptic cue module 22 applies a force cue to the user's head according to the pattern of force cue.

In a "passive mode," the computing module 21 determines a type of locomotion based on a VR content (VR images/video), and determines a motion signal based on a change in the VR images/video. The computing module 21 subsequently determines a pattern of force cue based on a motion signal of a locomotion in the VR, the pattern of force cue including a type of force cue, a position of application or a direction of application, a time of application, and an amplitude of force cue. When the motion signal is equal to or greater than a pre-determined threshold value, meaning that an application of force cue to the user is needed, the head-mounted haptic cue module 22 applies a force cue to the user's head according to the pattern of force cue.

It should be noted here that to avoid discomforts of a user and in view of that each user has a different tolerance range of discordance between visual sensory signals and other sensory signals, the range of the amplitude of the force cue may be user-configured, by setting a minimal amplitude value Hmin and a maximal amplitude value Hmax. After the configuration, the amplitude of the force cue applied will be ranging from Hmin to Hmax.

In one embodiment of the present invention, a pre-determined threshold value Mth and a saturation value Msat of a motion signal is related to a type of locomotion, or may be manually configured by a user (that is, the user may manually modify the pre-determined threshold value Mth and the saturation value Msat). When the amplitude of the motion signal is greater than the pre-determined threshold value Mth, a force cue of no less than Hmin is generated and applied to the user's head; and when the amplitude of the motion signal is greater than Msat, a force cue of Hmax is generated and applied to the user's head. In another embodiment, the amplitude of the force cue applied may be a constant value Hconst.

Please refer to FIG. 3, which is a flowchart of a method for reducing motion sickness in VR according to one embodiment of the present invention. Said method may be executed by a head-mounted device for reducing motion sickness in VR of FIG. 1A, FIG. 1B, or FIG. 2. In step S31, a pattern of force cue is determined based on a motion signal of a locomotion in the VR, the pattern of force cue including a type of force cue, a position of application or a direction of application, a time of application, and an amplitude of force cue. Subsequently, in step S32, a force cue is applied to a head of the user according to the pattern of force cue, wherein the force cue corresponds to an inertial force and/or a centrifugal force in connection with the motion signal.

The motion signal is a vector signal, and thus, the force cue is also a vector signal, and is applied to a position of the head of the user corresponding to the direction of the motion signal (or an inertial force and/or a centrifugal force in connection with the motion signal). Further, in addition to the type of the force cue, the relationship between the force cue and the motion signal may also be related to the type of locomotion. Time of application of the force cue starts from when the amplitude of the motion signal is equal to or greater than a pre-determined threshold value Mth, and the amplitude force cue applied does not exceed Hmax manually configured by the user.

Figure 4A:
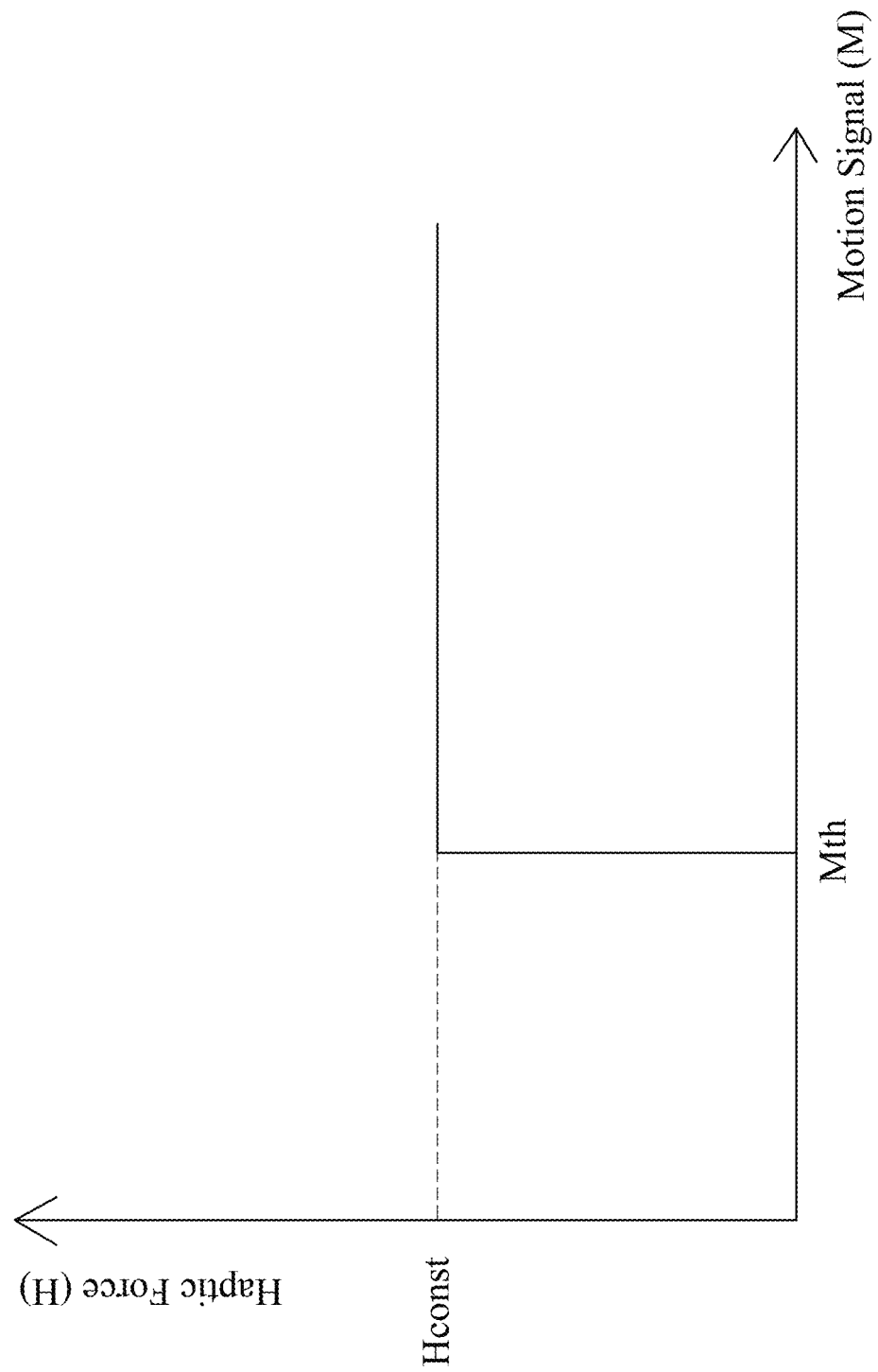
FIG. 4A illustrates a graph of the relationship between the motion signal and the force cue according to one embodiment of the present invention.

Now please refer to FIG. 4A, which illustrates a graph of the relationship between the motion signal and the force cue according to one embodiment of the present invention. If the type of locomotion is determined to be walking, and when the user walks faster or turns left or right, the stepping force of both foots or left or right foot would be greater, and when a foot is stepping on the ground, the VR images would have a greater change. A greater stepping force results in a motion signal M greater than Mth, and a force cue of a constant amplitude Hconst is generated and applied to the user's head, wherein the constant amplitude Hconst may be manually configured by the user.

Figure 4B:
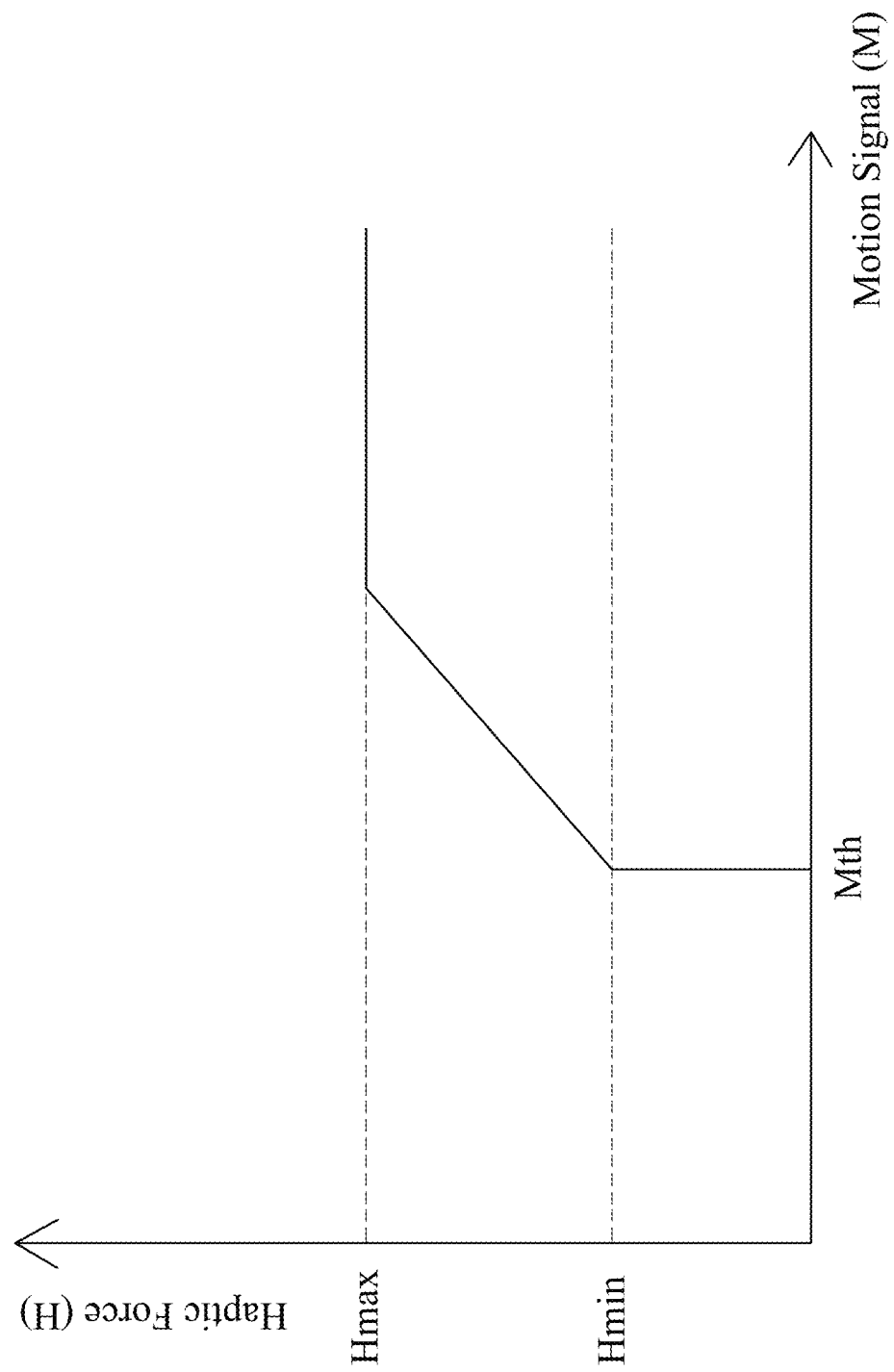
FIG. 4B illustrates a graph of the relationship between the motion signal and the force cue according to another embodiment of the present invention.

Please refer to FIG. 4B, which illustrates a graph of the relationship between the motion signal and the force cue according to another embodiment of the present invention. If the type of locomotion is driving, and when inertial force of left turn, right turn or slowing is greater than 0.15 g (corresponds to a pre-determined threshold value Mth) and less than 1.0 g (corresponds to a saturation value Msat), a force cue of an amplitude proportional to the amplitude of the motion signal is applied to a user's head, wherein H=(M−Mth)*[(Hmax−Hmin)/(Msat−Mth)+Hmin].

Figure 5A:
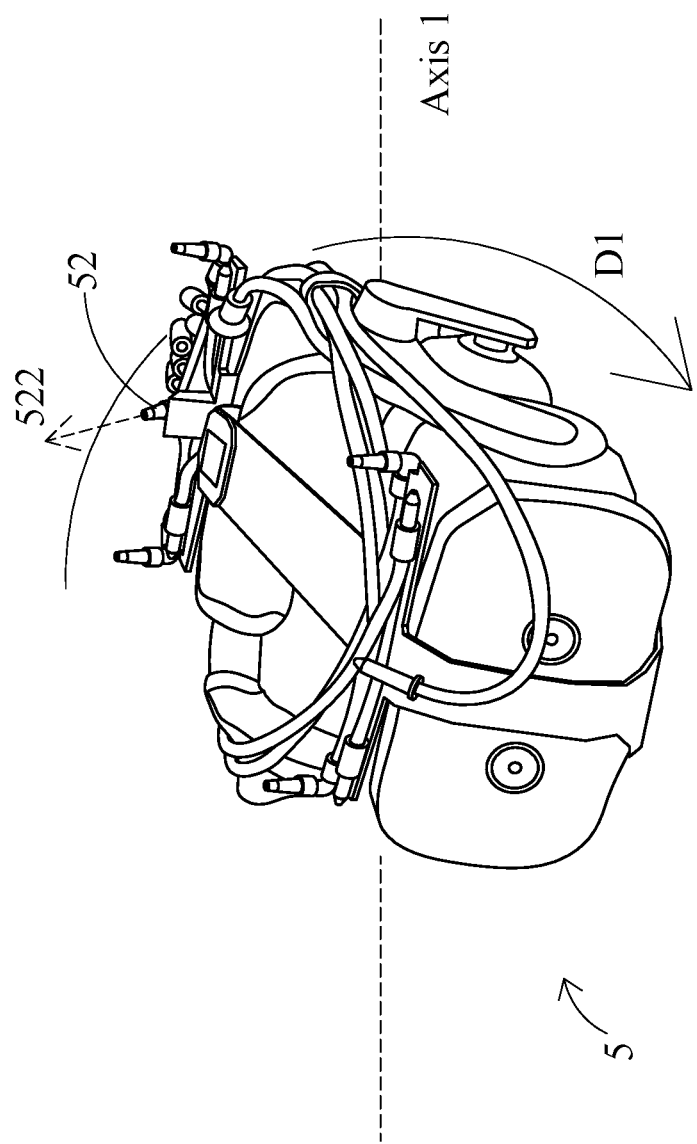
FIG. 5A shows that a haptic force generating element (an air nozzle 52) generates a rotational force cue having a direction D1 with respect to Axis 1.
Figure 5B:
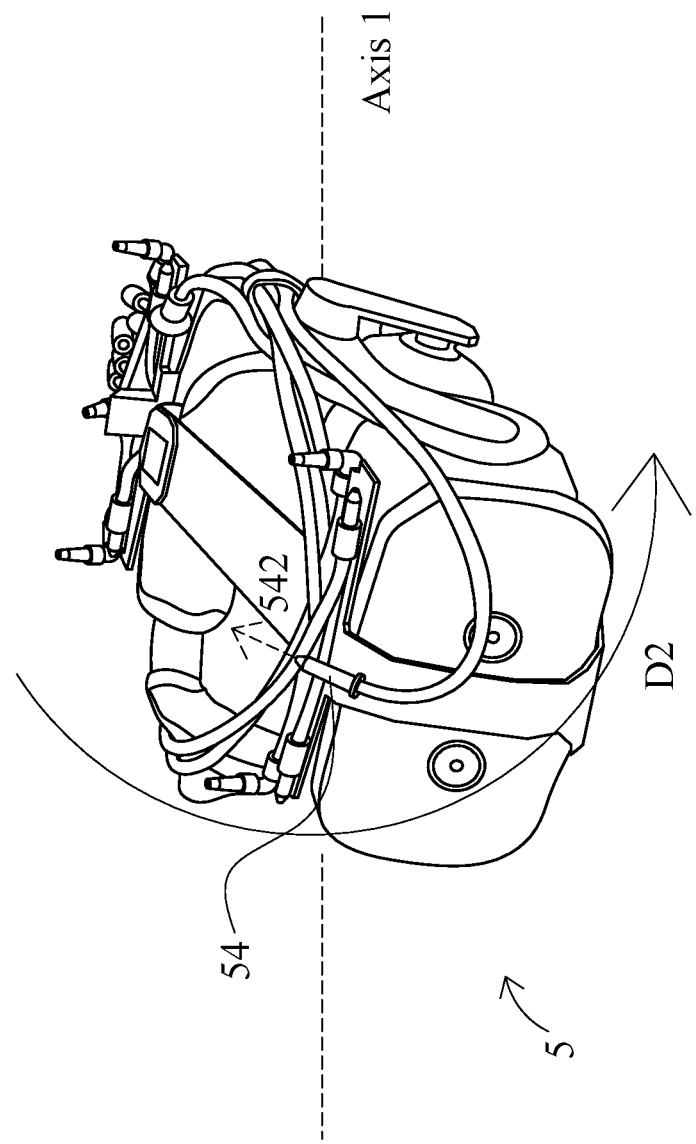
FIG. 5B shows that a haptic force generating element (an air nozzle 54) generates a rotational force cue having a direction D2 with respect to Axis 1.

FIG. 5A and FIG. 5B show a head-mounted display device 5 configured with a plurality of haptic force generating elements, each of which is an air nozzle for generating a rotational force. Referring to FIG. 5A, an air nozzle 52 is configured at a middle rear position on the head-mounted display device 5 and is pointing upward and slightly forward. The air nozzle 52 ejects an air jet 522 and generates a corresponding ungrounded rotational force cue having a direction D1 with respect to Axis 1. Referring to FIG. 5B, an air nozzle 54 is configured at a middle front position on the head-mounted display device 5 and is pointing upward and slightly backward. The air nozzle 54 ejects an air jet 542 and generates a corresponding ungrounded rotational force cue having a direction D2 with respect to Axis 1.

Figure 6A:
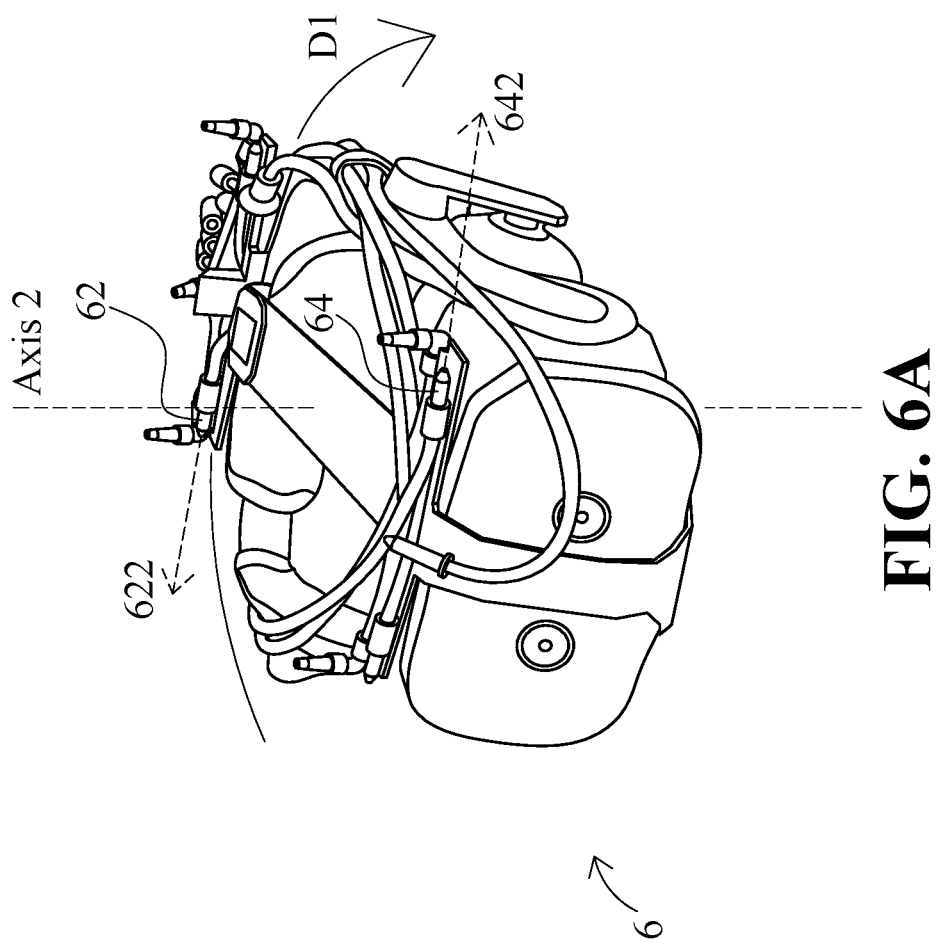
FIG. 6A shows that two haptic force generating elements (air nozzles 62 and 64) generate a rotational force cue having a direction D1 with respect to Axis 2.
Figure 6B:
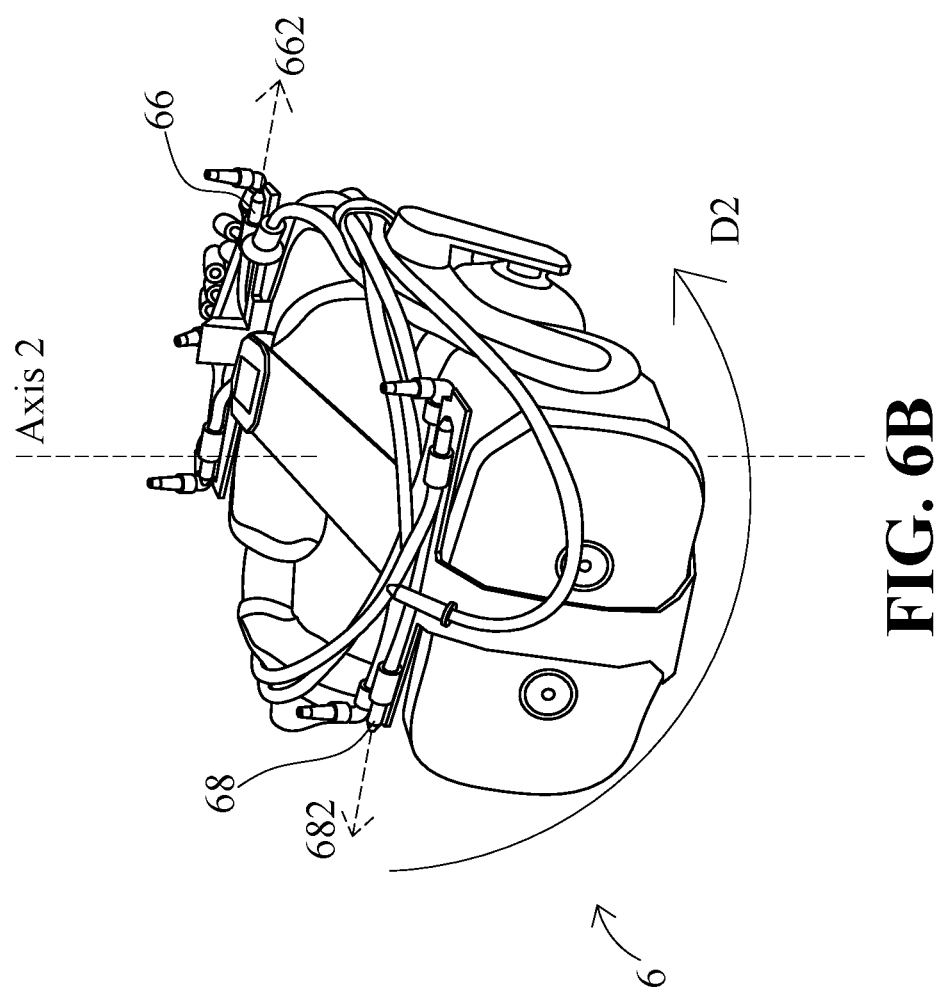
FIG. 6B shows that two haptic force generating elements (air nozzles 66 and 68) generate a rotational force cue having a direction D2 with respect to Axis 2.

FIG. 6A and FIG. 6B show a head-mounted display device 6 configured with a plurality of haptic force generating elements, each of which is an air nozzle for generating a rotational force. Referring to FIG. 6A, an air nozzle 62 is configured at a rear right position on the head-mounted display device 6 and is pointing to right (of a user), and another air nozzle 64 is configured at a front left position on the head-mounted display device 6 and is pointing to left. The air nozzles 62 and 64 eject air jets 622 and 642 respectively at the same time, and together generate a corresponding ungrounded rotational force cue having a direction D1 with respect to Axis 2. Referring to FIG. 6B, an air nozzle 66 is configured at a rear left position on the head-mounted display device 6 and is pointing to left (of a user), and another air nozzle 68 is configured at a front right position on the head-mounted display device 6 and is pointing to right. The air nozzles 66 and 68 eject air jets 662 and 682 respectively at the same time, and together generate a corresponding ungrounded rotational force cue having a direction D2 with respect to Axis 2.

Figure 7A:
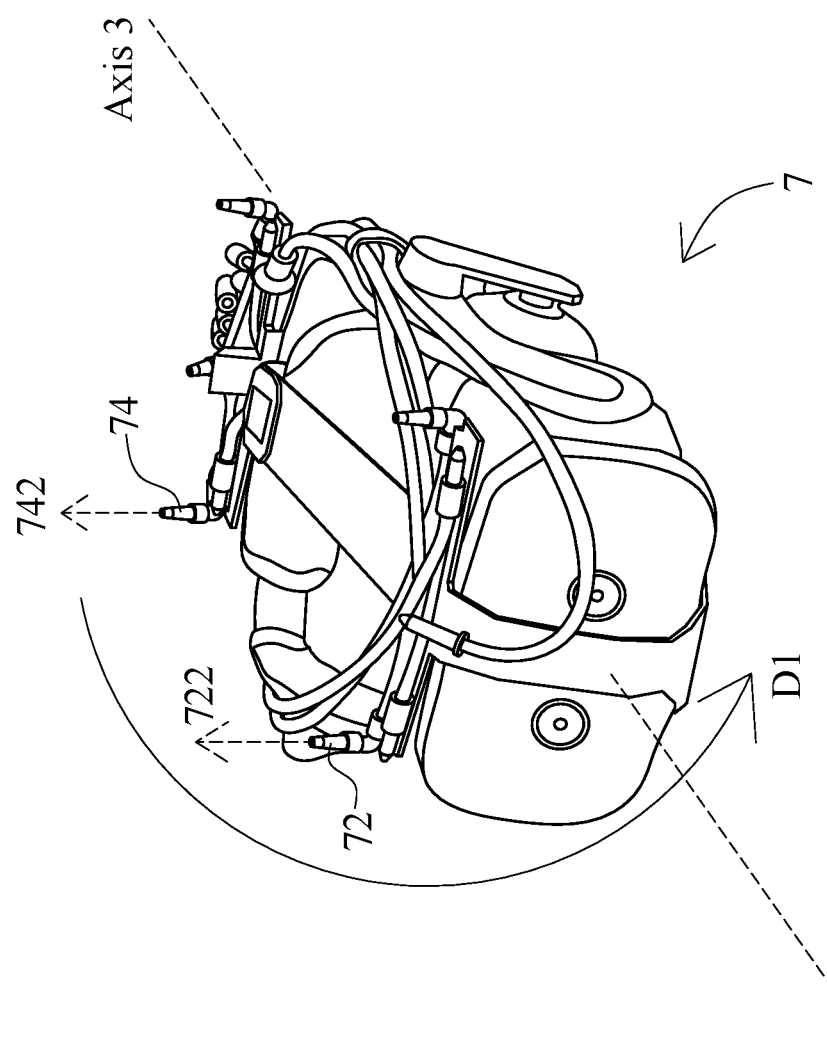
FIG. 7A shows that two haptic force generating elements (air nozzles 72 and 74) generate a rotational force cue having a direction D1 with respect to Axis 3.
Figure 7B:
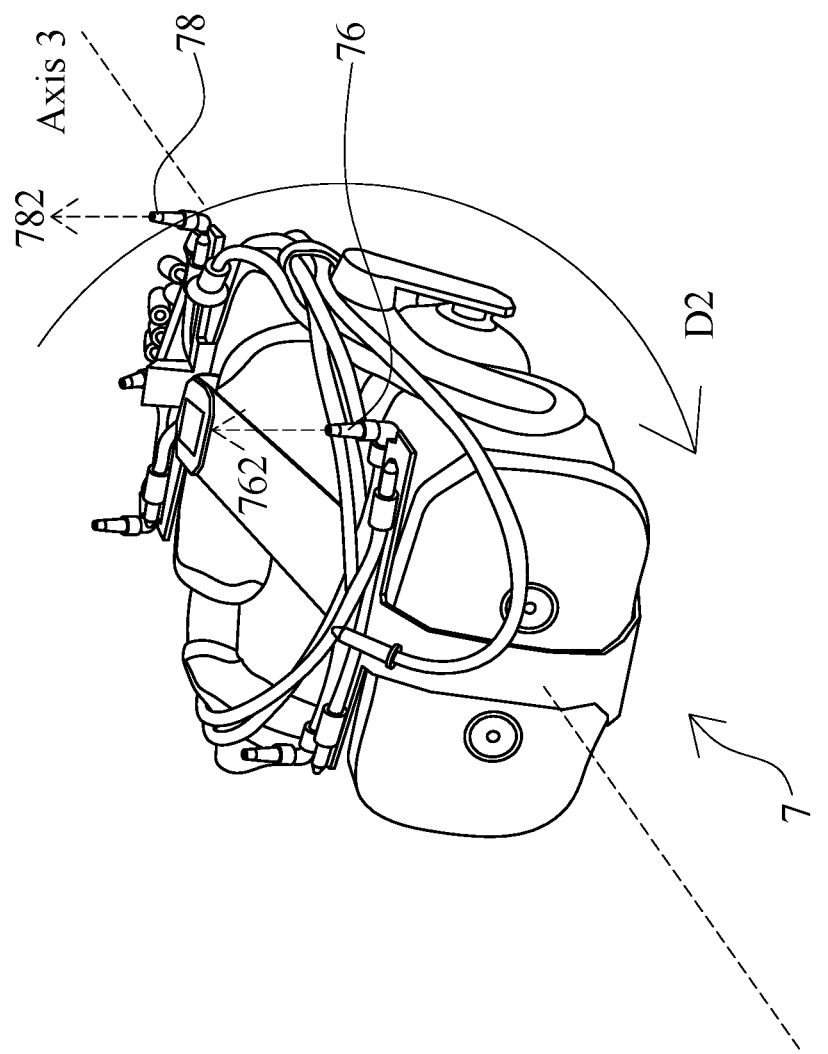
FIG. 7B shows that two haptic force generating elements (air nozzles 76 and 78) generate a rotational force cue having a direction D2 with respect to Axis 3.

FIG. 7A and FIG. 7B show a head-mounted display device 7 configured with a plurality of haptic force generating elements, each of which is an air nozzle for generating a rotational force. Referring to FIG. 7A, an air nozzle 72 is configured at a front right position on the head-mounted display device 7 and is pointing to upward, and another air nozzle 74 is configured at a rear right position on the head-mounted display device 7 and is pointing upward. The air nozzles 72 and 74 eject air jets 722 and 742 respectively at the same time, and together generate a corresponding ungrounded rotational force cue having a direction D1 with respect to Axis 3. Referring to FIG. 7B, an air nozzle 76 is configured at a front left position on the head-mounted display device 7 and is pointing upward, and another air nozzle 78 is configured at a rear left position on the head-mounted display device 7 and is pointing upward. The air nozzles 76 and 78 eject air jets 762 and 782 respectively at the same time, and together generate a corresponding ungrounded rotational force cue having a direction D2 with respect to Axis 3.

It is believed that a person of ordinary knowledge in the art where the present invention belongs can utilize the present invention to its broadest scope based on the descriptions herein with no need of further illustration. Therefore, the descriptions and claims as provided should be understood as of demonstrative purpose instead of limitative in any way to the scope of the present invention.

The invention claimed is:

1. A method for reducing motion sickness in virtual reality (VR) of a user, comprising:
   determining a pattern of force cue based on a motion signal of a locomotion in the VR, the pattern of force cue including a type of force cue, a position of application or a direction of application, a time of application, and an amplitude of force cue; and applying a force cue to a head of the user according to the pattern of force cue;

wherein the force cue corresponds to an inertial force and/or a centrifugal force in connection with the motion signal.

2. The method of claim 1, wherein the type of force cue is vibration.

3. The method of claim 2, wherein the pattern of force cue includes a position of application, and the position of application is related to a direction of the inertial force.

4. The method of claim 3, wherein (i) when the direction of the inertial force is leftward, the position of application corresponds to a left part of the head of the user, (ii) when the direction of the inertial force is rightward, the position of application corresponds to a right part of the head of the user, (iii) when the direction of the inertial force is forward, the position of application corresponds to a front part of the head of the user, and (iv) when the direction of the inertial force is backward, the position of application corresponds to a rear part of the head of the user.

5. The method of claim 2, wherein the vibration has a frequency of about 50 Hz to about 160 Hz.

6. The method of claim 1, wherein the type of force cue is of a translational force or a rotational force.

7. The method of claim 6, wherein the translational force or the rotational force is generated by one or more air nozzles configured on a head-mounted device.

8. The method of claim 6, wherein the translational force or the rotational force simulates the inertial force and/or the centrifugal force.

9. The method of claim 8, wherein the pattern of force cue includes a direction of application consistent with the direction of the inertial force and/or the centrifugal force.

10. A head-mounted device for reducing motion sickness in virtual reality (VR) of a user, comprising:

a computing module; and a haptic cue module electrically connected to the computing module, including a plurality of haptic force generating elements respectively positioned on the head-mounted device corresponding to a plurality of parts of a head of the user;

wherein the computing module determines a pattern of force cue based on a motion signal of a locomotion in the VR, the pattern of force cue including a type of force cue, a position of application or a direction of application, a time of application, and an amplitude of force cue; and the computing module commands the haptic cue module to apply a force cue, through at least one of the plurality of haptic force generating elements, to a head of the user according to the pattern of force cue; and wherein the force cue corresponds to an inertial force and/or a centrifugal force in connection with the motion signal.

11. The head-mounted device of claim 10, wherein the type of force cue is vibration.

12. The head-mounted device of claim 11, wherein the pattern of force cue includes a position of application, and the position of application is related to a direction of the inertial force.

13. The head-mounted device of claim 12, wherein (i) when the direction of the inertial force is leftward, the position of application corresponds to a left part of the head of the user, (ii) when the direction of the inertial force is rightward, the position of application corresponds to a right part of the head of the user, (iii) when the direction of the inertial force is forward, the position of application corresponds to a front part of the head of the user, and (iv) when the direction of the inertial force is backward, the position of application corresponds to a rear part of the head of the user.

14. The head-mounted device of claim 11, wherein the vibration has a frequency of about 50 Hz to about 160 Hz.

15. The head-mounted device of claim 11, wherein the force cue is generated by one or more haptic force generating elements, each of which is a vibration motor.

16. The head-mounted device of claim 10, wherein the type of force cue is of a translational force or a rotational force.

17. The head-mounted device of claim 16, wherein the force cue is generated by one or more haptic force generating elements, each of which is an air nozzle.

18. The head-mounted device of claim 16, wherein the translational force or the rotational force simulates the inertial force and/or the centrifugal force.

19. The head-mounted device of claim 18, wherein the pattern of force cue includes a direction of application consistent with the direction of the inertial force and/or the centrifugal force.

* * * * *